United States Patent
Weng et al.

(10) Patent No.: US 10,410,630 B2
(45) Date of Patent: Sep. 10, 2019

(54) SYSTEM AND METHOD FOR SPEECH-ENABLED PERSONALIZED OPERATION OF DEVICES AND SERVICES IN MULTIPLE OPERATING ENVIRONMENTS

(71) Applicant: Robert Bosch GmbH, Stuttgart (DE)

(72) Inventors: Fuliang Weng, Mountain View, CA (US); Katrin Schulze, Mountain View, CA (US); Zhongnan Shen, Milpitas, CA (US); Pongtep Angkititrakul, Union City, CA (US); Gengyan Bei, San Jose, CA (US); Xiao Xiong, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/315,289

(22) PCT Filed: Jun. 19, 2015

(86) PCT No.: PCT/US2015/036676
§ 371 (c)(1),
(2) Date: Nov. 30, 2016

(87) PCT Pub. No.: WO2015/196063
PCT Pub. Date: Dec. 23, 2015

(65) Prior Publication Data
US 2017/0116986 A1    Apr. 27, 2017

Related U.S. Application Data

(60) Provisional application No. 62/014,469, filed on Jun. 19, 2014.

(51) Int. Cl.
*G10L 15/22* (2006.01)
*G06F 21/32* (2013.01)
(Continued)

(52) U.S. Cl.
CPC .............. *G10L 15/22* (2013.01); *G06F 3/167* (2013.01); *G06F 21/32* (2013.01); *G10L 13/033* (2013.01);
(Continued)

(58) Field of Classification Search
CPC . G10L 19/167; G10L 19/22; G10L 2015/223; G10L 15/22; G10L 17/26;
(Continued)

(56) References Cited

U.S. PATENT DOCUMENTS 5,752,230 A    5/1998  Alonso-Cedo
7,778,193 B2   8/2010  Mizuno et al.
(Continued)

FOREIGN PATENT DOCUMENTS

EP    1349146 A1    10/2003
JP    2003-022092 A    1/2003
(Continued)

OTHER PUBLICATIONS

International Search Report corresponding to PCT Application No. PCT/US2015/036676, dated Sep. 15, 2015 (3 pages).
(Continued)

*Primary Examiner* — Abdelali Serrou
(74) *Attorney, Agent, or Firm* — Maginot Moore & Beck LLP (57) ABSTRACT

A system provides multi-modal user interaction. The system is configured to detect acoustic events to perform context-sensitive personalized conversations with the speaker. Conversation or communication among the speakers or devices is categorized into different classes as confidential, partially anonymous, or public. When exchange with cloud infrastructure is needed, a clear indicator is presented to the speaker via one or more modalities. Furthermore, different dialog strategies are employed in situations where conver-
(Continued)

sation failures, such as misunderstanding, wrong expectation, emotional stress, or memory deficiencies, occur.

1 Claim, 8 Drawing Sheets (51) Int. Cl.
| | |
|---|---|
| *G10L 13/033* | (2013.01) |
| *G10L 15/02* | (2006.01) |
| *G10L 17/04* | (2013.01) |
| *G10L 17/22* | (2013.01) |
| *G10L 25/87* | (2013.01) |
| *G06F 3/16* | (2006.01) |
| *G10L 17/00* | (2013.01) |

(52) U.S. Cl.
CPC .............. *G10L 15/02* (2013.01); *G10L 17/04* (2013.01); *G10L 17/22* (2013.01); *G10L 25/87* (2013.01); *G10L 17/00* (2013.01); *G10L 2015/223* (2013.01); *G10L 2015/228* (2013.01)

(58) Field of Classification Search
CPC ..... G10L 21/028; G10L 15/265; G10L 15/30; G10L 17/22; G10L 21/10; G10L 25/78; G10L 13/033; G10L 15/02; G10L 15/063; G10L 15/065; G10L 15/07; G10L 15/083; G10L 15/20; G10L 15/26; G10L 17/04; G10L 17/24; G10L 2015/228; G10L 21/14; G10L 21/16; G10L 25/54; G10L 25/57; G10L 25/87; G10L 15/08; G10L 15/005; G10L 15/14; G10L 15/1822; G10L 2015/0631; G10L 2015/225; G10L 25/69; G10L 15/183; G10L 15/197; G06F 3/0488; G06F 3/017; G06F 3/0482; G06F 3/165; G06F 3/167; G06F 17/30312; G06F 19/00; G06F 19/3418; G06F 19/3456; G06F 19/3462; G06F 19/3468; G06F 21/32; G06F 3/16; G06F 16/43; G06F 16/639; G06F 16/686; G06F 16/951; G06F 17/271

See application file for complete search history.

(56) References Cited

U.S. PATENT DOCUMENTS

| | | | |
|---|---|---|---|
| 8,521,766 B1* | 8/2013 | Hoarty | G10L 15/22 707/769 |
| 2002/0019734 A1* | 2/2002 | Bartosik | G10L 15/30 704/231 |
| 2002/0087306 A1* | 7/2002 | Lee | G06Q 30/06 704/233 |
| 2006/0074651 A1* | 4/2006 | Arun | G10L 15/22 704/233 |
| 2007/0061413 A1 | 3/2007 | Larsen et al. | |
| 2007/0216764 A1 | 9/2007 | Kwak | |
| 2008/0082339 A1 | 4/2008 | Li et al. | |
| 2010/0286490 A1* | 11/2010 | Koverzin | G06F 19/3418 600/301 |
| 2012/0226981 A1 | 9/2012 | Clavin | |
| 2013/0226369 A1* | 8/2013 | Yorio | G06F 17/00 701/1 |
| 2013/0275128 A1* | 10/2013 | Claussen | G10L 15/20 704/233 |
| 2013/0316682 A1 | 11/2013 | Vieira | |
| 2013/0329863 A1* | 12/2013 | Bentley | H04M 3/40 379/32.01 |
| 2014/0133663 A1* | 5/2014 | Grokop | H04M 1/72569 381/56 |
| 2014/0274203 A1* | 9/2014 | Ganong, III | H04W 52/0251 455/556.1 |
| 2015/0110263 A1* | 4/2015 | Johnston | H04R 1/1041 379/430 |
| 2015/0137998 A1* | 5/2015 | Marti | B60Q 9/00 340/901 |
| 2015/0172878 A1* | 6/2015 | Luna | H04W 4/12 455/412.2 |

FOREIGN PATENT DOCUMENTS

| | | |
|---|---|---|
| JP | 2004-109323 A | 4/2004 |
| WO | 2006128171 A2 | 11/2006 |

OTHER PUBLICATIONS

Supplementary Partial European Search Report corresponding to European Patent Application No. 15 80 9779 (13 pages).

* cited by examiner

SYSTEM AND METHOD FOR SPEECH-ENABLED PERSONALIZED OPERATION OF DEVICES AND SERVICES IN MULTIPLE OPERATING ENVIRONMENTS

CLAIM OF PRIORITY

This application is a 35 U.S.C. § 371 National Stage Application of PCT/US2015/036676, filed on Jun. 19, 2015, which claims the benefit of priority to U.S. Provisional Application No. 62/014,469, filed on Jun. 19, 2014 and entitled "System and Method for Speech-Enabled Personalized Operation of Devices and Services in Multiple Operating Environments," the disclosures of which are incorporated herein by reference in their entireties.

FIELD

This disclosure relates generally to the field of human computer interaction and, more specifically, to systems and methods for context-sensitive interaction with computing systems using voice or multi-modal inputs.

BACKGROUND

More and more devices are network-enabled, and consequently new applications are produced that make use of these network-connected devices through human-computer interaction (HCI) systems. This poses many challenges and opportunities for operating these devices by normal users and assisting the users with new user knowledge-rich interaction technology in an intuitive manner.

Prior art systems intelligent dialog systems for many applications and they are mostly designed for single users at any one time. Some systems incorporate speech recognition input. However, many different environments, including indoor, outdoor, and in-vehicle environments also include a variety of sounds and other acoustic inputs that go beyond simple voice command input. Existing systems treat acoustic inputs from the environment as sources of noise and employ filters and other signal processing techniques to attenuate various non-speech sounds as noises. Additionally, traditional speech recognition systems interact with a single user at a time to operate a single device without regard for the context of the user in the presence of other individuals or in the presence of different environment conditions. Consequently, improvements to human-computer interaction systems that improve the operation in various environments and contexts with more complex interactions would be beneficial.

SUMMARY

A software module in a human-computer interaction (HCI) system identifies various acoustic events in a predetermined environment other than spoken input to a voice recognition system. The characteristics of different acoustic events are trained, adapted, and detected. The module is for building an environment-sensitive voice interface with one or multiple users at home, in the vehicle, or other space.

A software speaker/receiver/transducer and emotion/mood status identification and tracking module that detects the speakers/receivers/transducers and the speech behavior of each speaker/receiver/transducer, such as repeats, hesitation, revision, interrupting, speaking rate, loud, soft, long, short; or emotional/mood status, such as happy, angry, sad, normal. In another embodiment, the system and method can identify speech defects, speech handicapped, or the like. Speakers are enrolled seamlessly during a small talk with the dialog system. A model for voice characteristics related to gender, age, region/accent, and pitch, is used to make conversation more efficient and meaningful. The speaker model for any single speaker is adapted over the time so that the model reflects the current status of the speaker. The data collected from any conversation for adaptation is selected so that short term effects are not incorporated into the long term trend. For example, a sudden change in the characteristics of a user due to cold should not be used for adapting his or her long term voice prints, but rather be used for conversation with comforting messages to fulfill the goal with emotional caring for the user. A specific caring and soft tone may be selected for the output speech, instead of an emotionless tone.

Multi-user dialog software module that understands the individual needs, and the consensus and differences among the group members, and provides personalized assistance. A default level of authority is setup initially, and adapted over the time with the use of the interactive dialog system. Each user is tracked based on the speaker identification module in the speaker identification and tracking module. The frequency of the agreements between the position or view point of a user and the final decision is recorded to predict a hierarchy in the group.

Cross-service application platform that integrates multiple devices, applications, and services. The application platform provides and manages internal links among different applications so that users do not have to make explicit requests for switches between different applications. Multiple computing devices that are integrated with appliances or other devices interact with the user. For example, a typical kitchen appliances may include refrigerator for food storage, oven, microwave and cook-top for cooking, hood for ventilation, dishwasher for cleaning, water heater or tank for hot water, gas, electricity or solar for energy sources. Sensors associated with these appliances provide constant appliance state updates, and the updates are managed in the platform to be used by the dialog manager for either system-initiated dialogs or user-initiated dialogs. A related service portfolio may include applications for food purchasing, appliance purchase, maintenance and repair, event reminders, calendar reminders, text message display, audio recording playback, video/visual display/playback, billing information, infotainment applications for news, music, and sports, and hands-free communication. The functions of a hands-free communication may include making a phone call, picking up the phone call, and ending a phone call. The above mentioned devices, applications or services are accessed and operated via a voice terminal or a personal robot with the dialog system.

The software dialog system covers the whole lifecycle of any device and device eco-system, including the purchasing, setting up, operation, repairing, and transitioning. Adding or removing a device from the system may be controlled by the system platform infrastructure, and facilitated by the dialog system. Individual user interactive experience with the device and device system is maintained in encrypted profiles in files and stored both locally and in the cloud. The cloud storage becomes optional if the user prefers to use the local one only. The enrollment of a device is done similarly with the dialog system and the default parameters of the device are carried over from the past profile if any, and are via real life and short examples to guide the user to provide needed preferences.

Task-dependent and user-dependent privacy and security management via seamless log-in and constant monitoring and tracking of biometric and behavior prints of the speaker and together with multiple layered security system which relies on the different requirements for the needed access and operation securities. The biometric and behavior prints of the speaker are typically stored locally. The keys to access the sensitive files are a combination of biometric and user knowledge and can be stored both locally and in the cloud. Multiple locations in the cloud are used to store the complete keys if the cloud is used for the desired purpose. Only when the parts from all the locations are combined, a complete key is recovered to be able to access the profiling files. The allocation of the multiple cloud sites and local devices is performed by the platform. However, the dialog system may ask the user their requirements in terms of the degree of security for the specific devices and related performance tasks, and provide to the user certain recommendation for the typical level of security needed for such devices and performance tasks related to the devices. A security ontology with different levels and typically associated tasks is maintained in the dialog system to facilitate the discussion with the user and give advices when so requested.

These software systems are implemented via hardware voice terminal or mobile robot that provides microphone array to interface with users in order to acquire acoustic data, process them, and transmit them into devices for operation and information access, and via an augmented central processing unit that provides the heavy duty processing of the acoustic signals, understanding of the events, conducting reasoning and dialog management with knowledge base and contextual information. The integrated system addresses multiple users with far-field talking. The system tracks and understands each individual speaker and performs the intended actions by the users. The dialog system covers the lifecycle of device and device eco-system, captures and protects the user characteristics during the conversation with the system, and makes use of such characteristics for better communication.

In one embodiment, an HCI system that performs authentication and access control based on a hierarchy of users has been developed. The HCI system includes at least one user input interface, at least one output interface, an automated device, and a control system operatively connected to the at least one user input interface, the at least one output interface, and the automated device. The control system is configured to receive a series of spoken inputs from a user with the at least one input interface, identify the user using a continuous authentication process with a privacy and security management module in the control system, predict a level of authority for the user within a hierarchy of a plurality of users of the system, operate the automated device based on a command from the user in the series of spoken inputs only in response to the level of authority for the user being great enough to authorize the operation of the automated device.

In another embodiment, an HCI system that performs progressive enrollment with personalization has been developed. The HCI system includes at least one user input interface, at least one output interface, and a control system operatively connected to the at least one user input interface and the at least one output interface. The control system is configured to receive spoken input corresponding to a name of a user during a progressive user enrollment process, generate a phonetic pronunciation sequence corresponding to the name of the user, and generate an audible output with the at least one output interface including a synthesized version of the name of the user based on the phonetic pronunciation sequence prior to receiving a spelling of the name of the user during the progressive enrollment process.

In another embodiment, an HCI system identifies a status of a user and updates an output for the user based on the status of the user. The HCI system includes at least one user input interface, at least one output interface, and a control system operatively connected to the at least one user input interface and the at least one output interface. The control system is configured to receive spoken input from a user with the at least one user input interface, identify a status of the user with reference to the spoken input from the user, and update an output dialog to produce an output with the at least one output interface to complement the status of the user.

In another embodiment, an HCI system identifies sources of environmental noise to increase the recognition of speech accuracy from one or more users. The HCI system includes at least one user input interface, at least one output interface, and a control system operatively connected to the at least one user input interface and the at least one output interface. The control system is configured to receive environmental sounds from an environment around the at least one user input interface, identify an acoustic event based on the environmental sounds using an acoustic event recognition module in the control system, and generate an output with the at least out output interface including an identification of the environmental sounds based on the identified acoustic event and a request to reduce or eliminate the environmental sound to improve voice input to the at least one user input interface.

In another embodiment, an HCI system includes lifecycle management for one or more devices in the HCI system. The HCI system includes at least one user input interface, at least one output interface, a plurality of devices, and a control system operatively connected to the at least one user input interface, the at least one output interface, and the plurality of devices. The control system is configured to receive a request to add an additional device to the plurality of devices, receive registration data from the additional device, generate a dialog with the output interface to request user configuration data for the additional device based on the registration data, receive input from a user including the user configuration data for the additional device in response to the dialog, and operate the additional device with the user configuration data.

In another embodiment, an HCI system implements an authentication process using a distributed key. The HCI system includes at least one user input interface, at least one output interface, and a control system operatively connected to the at least one user input interface and the at least one output interface. The control system is configured to receive spoken input from a user with the at least one input interface including biometric data in the voice of the user and spoken authentication data, retrieve with a security management module plurality of key segments for an authentication key corresponding to the user over a network from a plurality of distributed online data storage services, generate the authentication key using the plurality of key segments, and accept additional input from the user only in response to the biometric data and spoken authentication data corresponding to the authentication key.

DETAILED DESCRIPTION

For the purposes of promoting an understanding of the principles of the embodiments disclosed herein, reference is now be made to the drawings and descriptions in the following written specification. No limitation to the scope of the subject matter is intended by the references. The present disclosure also includes any alterations and modifications to the illustrated embodiments and includes further applications of the principles of the disclosed embodiments as would normally occur to one skilled in the art to which this disclosure pertains.

Figure 1:
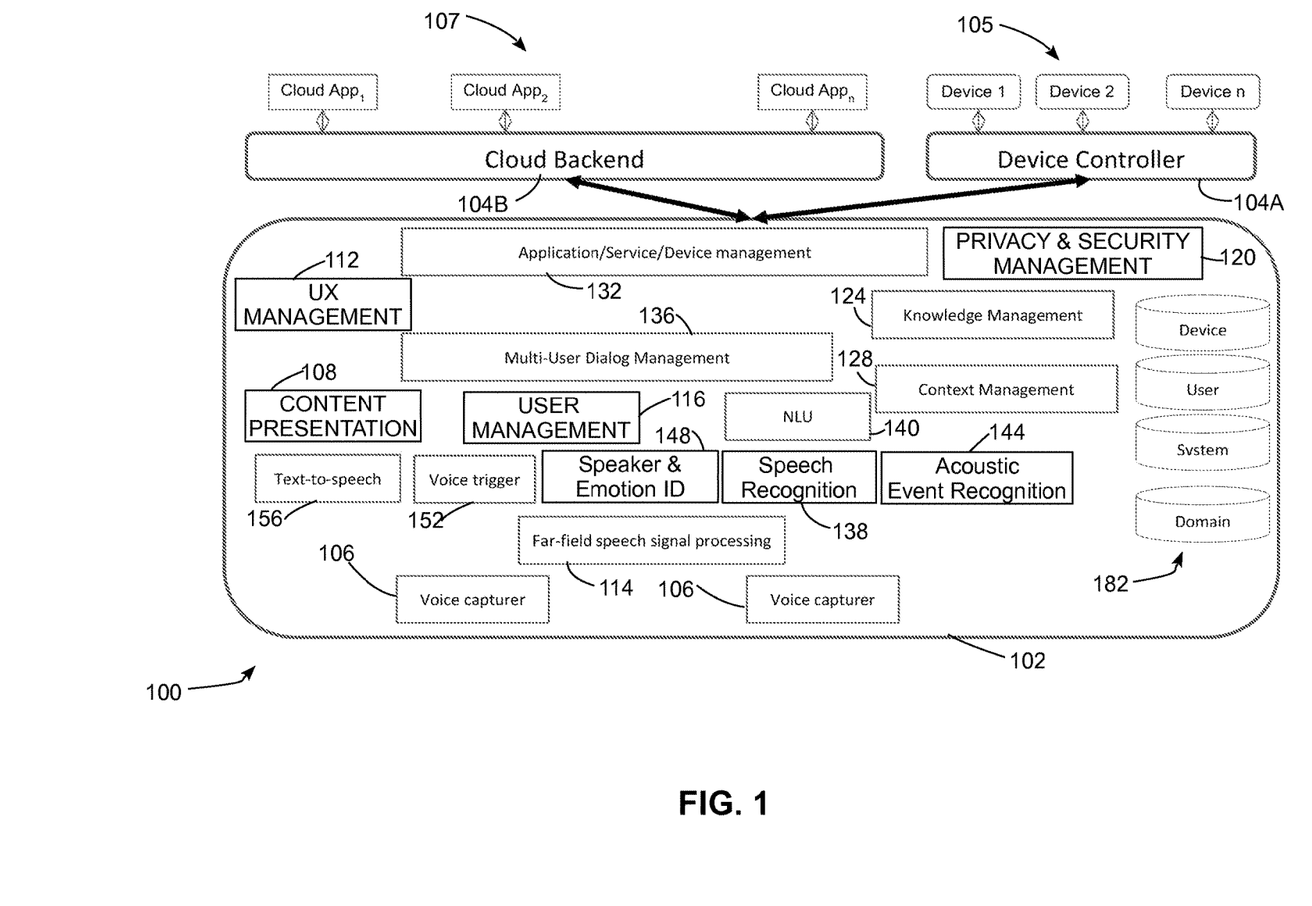
FIG. 1 is a system diagram of a voice-interaction human computer interface (HCI) that identifies contextual information pertaining to an environment around the user.
Figure 2:
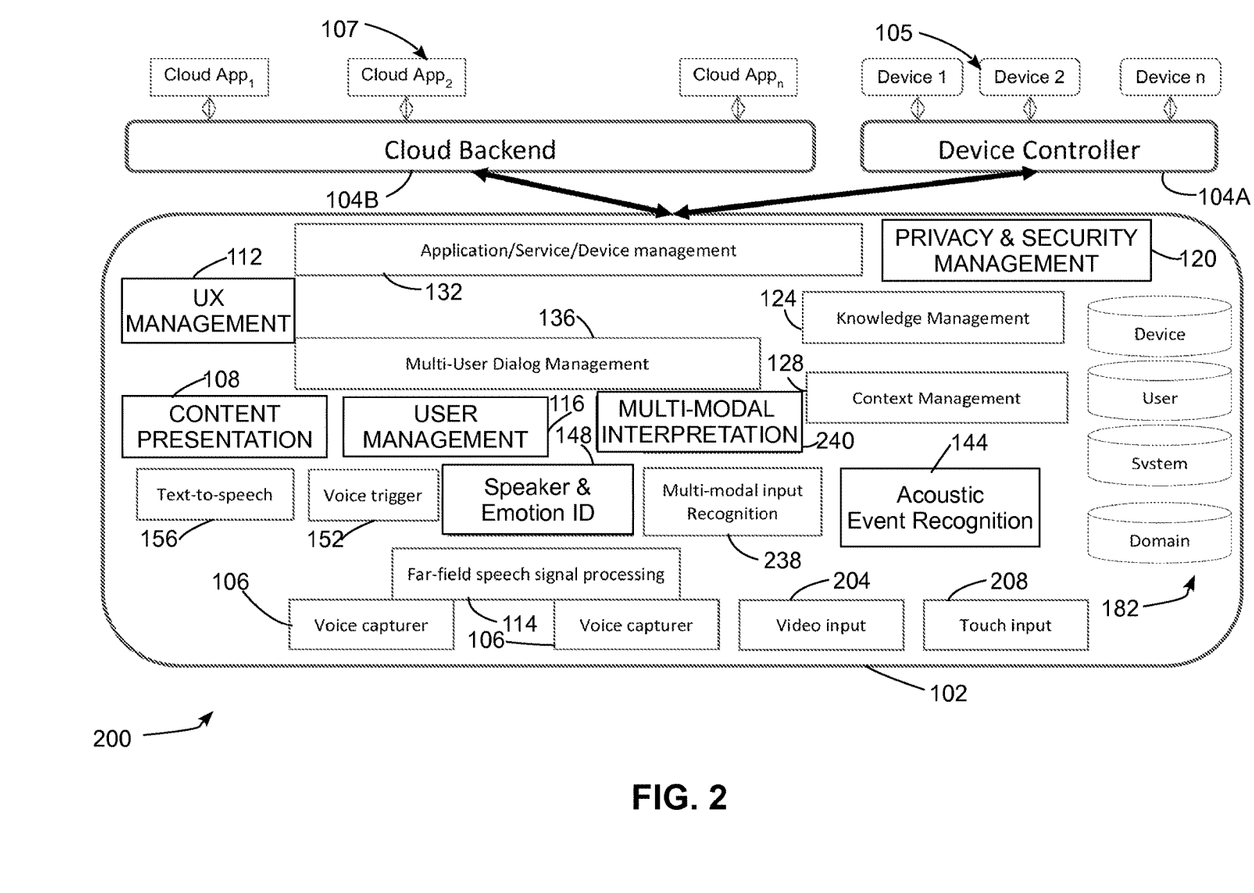
FIG. 2 is a system diagram of a multi-modal human computer interface (HCI) that identifies contextual information pertaining to an environment around the user.

FIG. 1 is a diagram of a spoken-voice human-computer interaction (HCI) system 100. The diagram in FIG. 1 depicts a system that uses speech recognition and recognition of other audible inputs from the environment around one or more users as inputs and operates one or more devices or generates audio-visual output. FIG. 2 is a diagram of another HCI system 200 that incorporates multi-modal input from the users. Multi-modal inputs include, but are not necessarily limited to, speech input, gesture input, and more traditional input methods including keyboards, mice, touch-screens, and physical controls such as switches, dials, and the like. The HCI systems of FIG. 1 and FIG. 2 share many common modules and modules. The HCI systems 100 and 200 are implemented using one or more computing devices, with one configuration including a front end "terminal" computing device that includes performing input and output and communicating with one or more additional computing devices via a data network. The additional computing devices include, but are not limited to, network-based (so-called "cloud") services and embedded devices, including home appliances, building automation systems, mobile electronic devices, and in-vehicle information systems. In the discussion below, references to "modules" refer to one or more digital processing devices that executed stored program instructions to implement the HCI functionality for interaction with one or more users.

The HCI systems 100 and 200 include a control system 102 that receives input from the user, provides output dialogs to the user for interactive operation, and controls the operation of one or more automated devices 105 such as household appliances, HVAC and other building control systems, components in a motor vehicle, and the like. The controller 102 is implemented using one or more digital computing devices that include one or both of a local device controller 104A that is connected to the devices 105 directly or through a local area network (LAN) and a network based "cloud" backend system 104B that implements one or more cloud software applications 107 to implement the functionality of the control system 102. The cloud backend 104B is typically embodied as a distributed computing system with multiple computing nodes that each implement one or more of the cloud applications 107 and communicate with each other and the local device controller 104A via a data network. Many embodiments implement the functionality of the control system 102 using functions from both the local device controller 104A and the cloud backend system 104B, which are communicatively coupled via a data network such as the Internet.

The HCI systems 100 and 200 include a memory 182 that incorporates one or more data storage devices to store programmed instructions along with device configuration data, user data, system data, and domain data. The device data includes, for example, hardware address and other unique identifiers for the devices 105, configuration data to control operational settings of the devices 105, and optionally diagnostic data from the devices 105. The user data include stored voice and gesture models for individual users, authentication data for the users including authorization levels for multiple users in a hierarchy, and individualized preference data that enable the systems 100 and 200 to respond to different users in a personalized manner. The system data include stored program instructions and other configuration data for operation of the control system 102. The domain data include one or more ontologies and other domain-specific data that enable the device control system 102 to identify context in the input information from users and the environment around the devices 105.

The HCI systems 100 and 200 both include at least one input interface including, for example, microphones for voice input capture devices 106 and, in the HCI system 200, video input 204 and touch input 208 interfaces. A far-field microphone array and signal processing module 114 takes the acoustic signals from different voice capture channels with phase information for later stage processing. The microphone array includes one or more voice input microphones 106 and the array is optionally incorporated in a user input terminal, a mobile robot, or other location that can receive audible input from one or more users and from other acoustic sources in the environment around the users.

In the HCI systems of FIG. 1 and FIG. 2, a software speaker and emotion/mood identification and tracking module 148 detects the speakers/receivers/transducers and the speech behavior of each speaker, such as repeats, hesitation, revision, interrupting, speaking rate, loud, soft, long, short; or emotional status, such as happy, angry, sad, normal. Speakers are enrolled seamlessly during a series of one or more dialog sessions with the dialog system. A model for voice characteristics related to gender, age and region/accent is used to make conversation more efficient and meaningful. The speaker model for any single speaker is adapted over the time so that the model reflects the current status of the speaker. The data collected from any conversation for adaptation is selected so that short term effects are not incorporated into the long term trend. For example, a sudden change in the characteristics of a user due to cold should not be used for adapting his or her long term voice prints, but rather be used for conversation with comforting messages to fulfill the goal with emotional caring for the user. A specific caring and soft tone may be selected for the output speech, instead of an emotionless tone.

Figure 5:
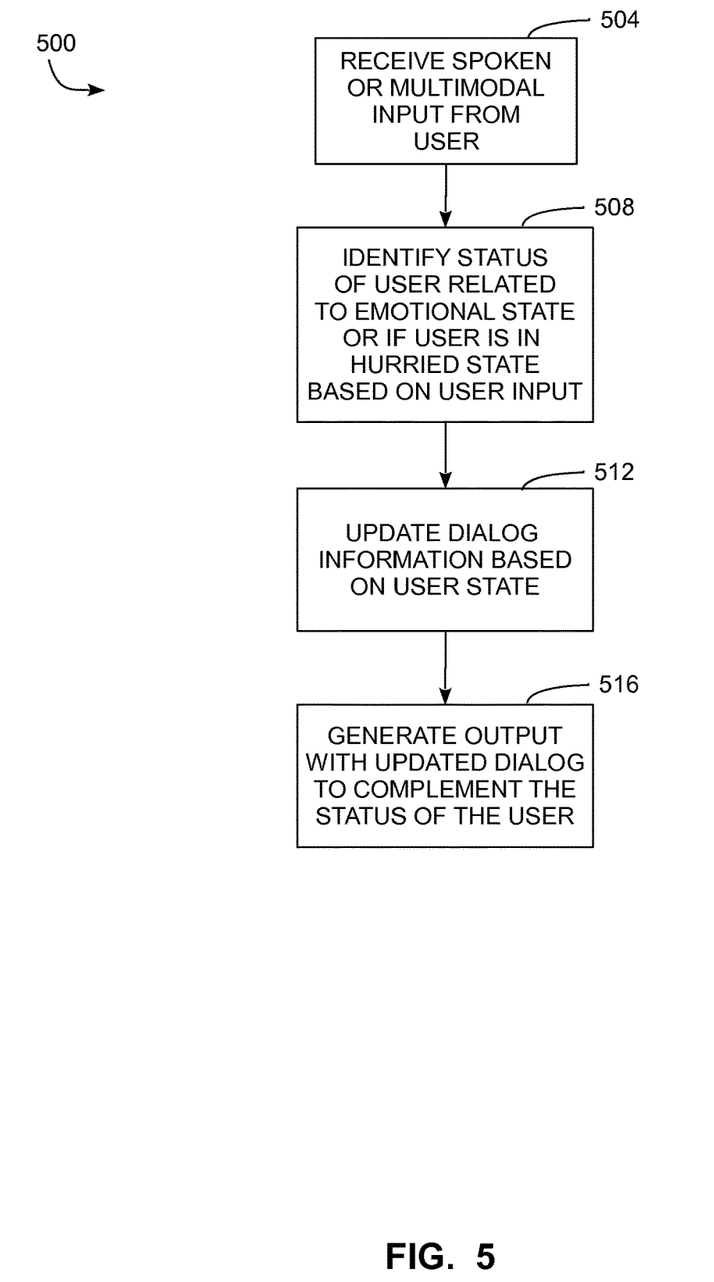
FIG. 5 is a block diagram of a process for operation of the user experience (UX) manager in the HCI systems of FIG. 1 and FIG. 2.

FIG. 5 depicts a process 500 for operation of the HCI systems 100 and 200 to detect the status of the user including, for example, emotional states and whether the user interacts with the HCI system in a hurried or relaxed manner. In the HCI systems 100 and 200, the UX module 112 optionally modifies dialogs to adjust the user experience based on the status of the user. During the process 500, the HCI system receives a spoken or multi-modal input from the user (block 504). The input can be, for example, a command or user request for information. In the systems 100 and 200, the speaker and emotion ID module 148 identifies a status of the user based on information from the user input related to the emotional state or if the user is in a hurried state (block 508). For example, in speech input the tone and cadence of the spoken input can be indicative of the status of the user. The control system 102 identifies the emotional status and updates the contents of a response dialog to complement the identified status of the user (block 512). For example, if the user is in a hurried state and speaks with a fast cadence, then the UX module 112 optionally generates an abbreviated version of a dialog response or increases the cadence of a speech output dialog to complement the rate of speech of the user if the user speaks at a rate exceeding a predetermined threshold. The HCI system then generates the output including the updated dialog to provide a dialog output that complements the current status of the user (block 516). As described above, in other situations the dialog management module 136 modifies the dialog output in other ways that complement the emotional status of the user.

The HCI systems 100 and 200 include an acoustic event recognition module 144 that identifies whether the sound is from an event such as door slam, walking steps, music playing, object falling ground, breaking glasses or dishes, meat cutting, vegetable cutting, vacuum cleaner, heating, water running, toilet flushing, drilling, phone ring, humming, a baby or child screaming, coughing, background talking, dog barking, cat meow/purr/roar, cocktail party, washing food, cutting food, cooking, ventilation, bathroom flushing, bath shower, washing machine running, dryer running, phone ringing, clock ticking, window opening with street noises, road noises, wind blowing, raining, thunder, car horning, engine starts. Each event has an associated acoustic event print. The characteristics of different acoustic events are trained, adapted, and detected. Any acoustic input is compared with the event prints and is assigned with a corresponding label. This module is for building an environment-sensitive voice interface with one or multiple users at home, in the car, or other space. When the events are accurately recognized, the dialog system may ask the user to be away from the events, stop the associated activities, or lower the noise level so that the system may hear and understand the user/speaker better.

Figure 6:
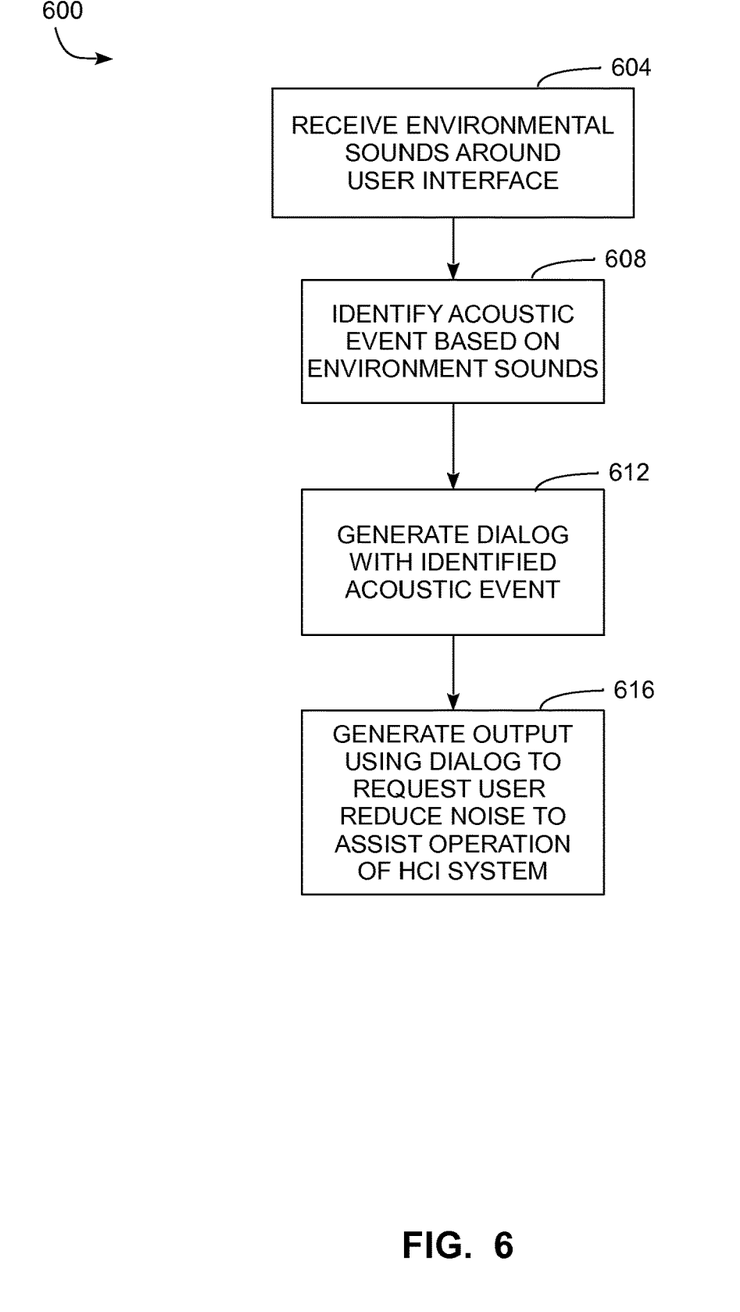
FIG. 6 is a block diagram of a process for operation of the HCI systems of FIG. 1 and FIG. 2 based on environmental context.

FIG. 6 depicts a process 600 for operation of the HCI systems 100 and 200 to identify acoustic events and to request assistance from the user to reduce the effects of environmental factors on the operation of the HCI systems 100 and 200. The systems 100 and 200 receive environmental sounds via the microphones 106 even if none of the users are providing direct input (block 604). The control system 102 identifies an acoustic even based on the sounds from the environment (block 608). As noted above, the acoustic event recognition module 144 identifies characteristic acoustic signatures for events that commonly occur in the environment around the HCI systems 100 and 200. During process 600, the control system 102 generates a dialog that identifies the source of the acoustic event (block 612) and generates an output for the users to request that the users take action to reduce or eliminate the source of the noise (block 616). The output message identifies the source of the noise in the environment to assist the user in finding and eliminating the environmental noise that may interfere with the operation of the HCI systems 100 and 200. In some embodiments, the control system 102 performs the process 600 if the user attempts to provide input but the speech recognition module 138 cannot identify the speech input due to the environmental noise.

The HCI system of FIG. 1 and optionally the multi-modal HCI system of FIG. 2 incorporate a voice trigger module 152 that sends a trigger event when a default phrase is said by the speaker. This default phrase can be changed via a conversation with the system by the speaker. For the very first step, a process is used to establish a name for the system to be used by the group of people. The voice trigger module 152 is trained with a name suggested and repeated multiple times by one or more people from the group. The name of the system can be provided via talking to the dialog system, spelling the name, keying in the name via an application, or hand-writing the name. The entire dialog system setup can be followed (see the user enrollment and system acquaintance process below). After a name is established with the dialog system, people can use the name to wake up the dialog system for interaction, device control, and service access. One may use the "call-to-initiate" approach, the name needs to be used only once for a dialog session. A dialog session will end after a few seconds of silence or a series of requests is completed.

The HCI system of FIG. 1 includes a natural language understanding (NLU) module that converts a sequence of words into one or more semantic representations from a speech recognition module 138 that takes the acoustic signals and converts them into a sequence of words. The multi-modal HCI system 200 of FIG. 2 optionally includes the speech recognition module 138 and NLU module 140 as part of a multi-modal input system from the system 100 and includes recognition of other forms of input using the multi-modal input recognition module 240. The system 200 also includes an optional touch and gesture input module 238 that takes the gesture input from touch input sensors 208 or video gesture input sensors 204 and understands the intention of the gesture in combination with the input from the other modalities. The gesture module is one input to the multi-modal interpretation module 240 in the embodiment of FIG. 2. The multi-modal interpretation module converts the multi-modal symbol sequences (e.g., word sequence, shapes) into meaning representations. The meaning representation may include the action(s) the user asks the system to take, the objects the action(s) needs to apply onto, the constraints related to the objects and actions, as well as the input modality associated with the meaning representation. The multi-modal symbol sequences may use lattice as a representation. The lattice may include confidence scores along with the symbol sequences from different recognition modules, which may reside locally onboard or remotely in the cloud.

The context management module 128 in the embodiments of FIG. 1 and FIG. 2 manages the dynamic information of the context, including the context used for recognizing speech, the active name lists used for recognizing proper names, the context of the active application (e.g., the current temperature of the oven, the running status of the dish washer, the current view of the map, the state of the lights in different rooms), the context of the active environment (e.g., outdoor temperature and humidity, rainy or sun shining, road and traffic conditions, weather conditions), the context of the user (e.g., the user is cutting vegetable or cooking a dish, the user is sitting on a sofa in a living room, the user is driving on high way, the user is making a turn on local street, the user is listening to music, the user is sleepy, and the acoustic events from the acoustic event recognition module 144), the context of the room where the user is in (e.g., room temperature, room humidity, room oxygenation density), the content in the refrigerator, or the context of the vehicle the user is driving (e.g., the gas tank level, the speed of the vehicle). The contextual state information may be obtained from the sensors, and the sensor info are managed via the cross-service application platform.

The knowledge management module 124 in the embodiments of FIG. 1 and FIG. 2 manages the domain/application-related knowledge (e.g., ontology for point of interests in navigation, ontology for the components in home appliances, or ontology for services), the common sense knowledge (e.g., people needs to drink water, people cannot fly without tools, the car should not hit another person), the knowledge about the users (e.g., personal preferences in different application domains), or the knowledge about language uses (e.g., the sentence or phrase structure). The knowledge content about a specific domain, for example, the navigation domain, can be obtained with a representation conversion from the corresponding service providers. The knowledge about the users can be constructed using the history of the past conversations either implicitly or explicitly between the users and the system as well as the actions the users took. Such interaction can be speech-based or multi-modal as described above.

The application or service management module in the embodiments of FIG. 1 and FIG. 2 receives task requests from the dialog/interaction manager and identifies one or more available services that are used to complete the task requests. The available services and assistance providers are maintained in a service registry in semantic forms. This module may use automatic service decomposition to decompose the task request into atomic requests that can be solved by the service providers. It then may use service composition approach to collect the sub-solutions from these providers and complete a solution for the requested task. This module may use any external intelligent assistance systems to find a solution for the task in hand. When multiple solutions from these service providers and assistance systems are obtained for a requested task, the application manager will need to provide a ranking recommendation based on the quality of the solutions and the past performance of these service providers and assistance systems. The recommended solutions are then passed down to the dialog manager and get presented to the users via content presentation module 108 that incorporates at least one output interface including, for example, a text-to-speech (TTS) or visual output interface. After user decides on one or more solutions and communicates to the dialog system, the confirmed solutions will be executed. If more information is needed from the users, the dialog system will also communicate the required information to the users, collect the user feedback, reformulate the requirements for the task, and submit to the application module again for one or more new solutions. This process is repeated until either the system finds the solutions that meet the user requirements, or the user discontinues the request refinements.

The HCI systems 100 and 200 include a multi-user dialog/interaction management module 136. The dialog interaction management module 136 manages the dialog between multiple users and the system. The module takes the meaning representation associated with user id from the interpretation module, resolving any ambiguity in the representation using the information from the context management module 128 and the knowledge management module 124, and then it queries the application management module 132 for a possible solution. In case that an ambiguity in the meaning representation cannot be resolved, the dialog interaction module may carry a clarification dialog with the user to resolve the ambiguity. In case that the application manager needs more information, the dialog module communicates the needed information to the content presentation module 108. In case that there are conflicting results from different service channels, the dialog manager performs a ranking procedure using the available knowledge from knowledge manager 124 and available context from the context manager 128. The dialog manager performs an interactive clarification process with the users if the conflicting results cannot be resolved by the system alone. The dialog manager will use the context and environment information from the context management module 128 to manage the interactions with the users. For example, when a user looks for a gas station on highway, the intelligent dialog system may put higher priority for the stations ahead than the stations in the behind.

The dialog manager also maintains a reminder list that keeps the items the user wants to be reminded in a certain context. Furthermore the dialog manager understands and maintains the individual needs, and the consensus and differences among the group members, and provides personalized assistance. The HCI system generates an initial default level of authority, which is adapted over the time through the use of the interactive dialog system. Each user is tracked for what has been said with the speaker identification functionality in the speaker identification and tracking module 148. Each recognized utterance and subsequent processed meaning representations are associated with the speaker id in the dialog system. When multiple topics or tasks are mentioned in the conversation, the topics are maintained in a network data structure, where the conversational utterances for a specific topic or task by the same or different speakers are linked in a temporally ordered sequence. When a topic (e.g., find a hotel) is merged with another topic (e.g., find a flight) into a more general topic (e.g., travel planning), these filled constraints (e.g., time, location) are verified for consistency and combined into the more general topic with the sub-topics as its sub-structures attached for reference. When multiple speakers participate in a conversation on a topic, different speakers may provide different suggestions for the constraints. For example, when finding a restaurant for lunch, parents may prefer one type of restaurants than children. The frequency of the agreements between the position of a user and the final decisions is recorded. The frequency may be used for recommendation in the future or to predict a hierarchy in the group.

Figure 3:
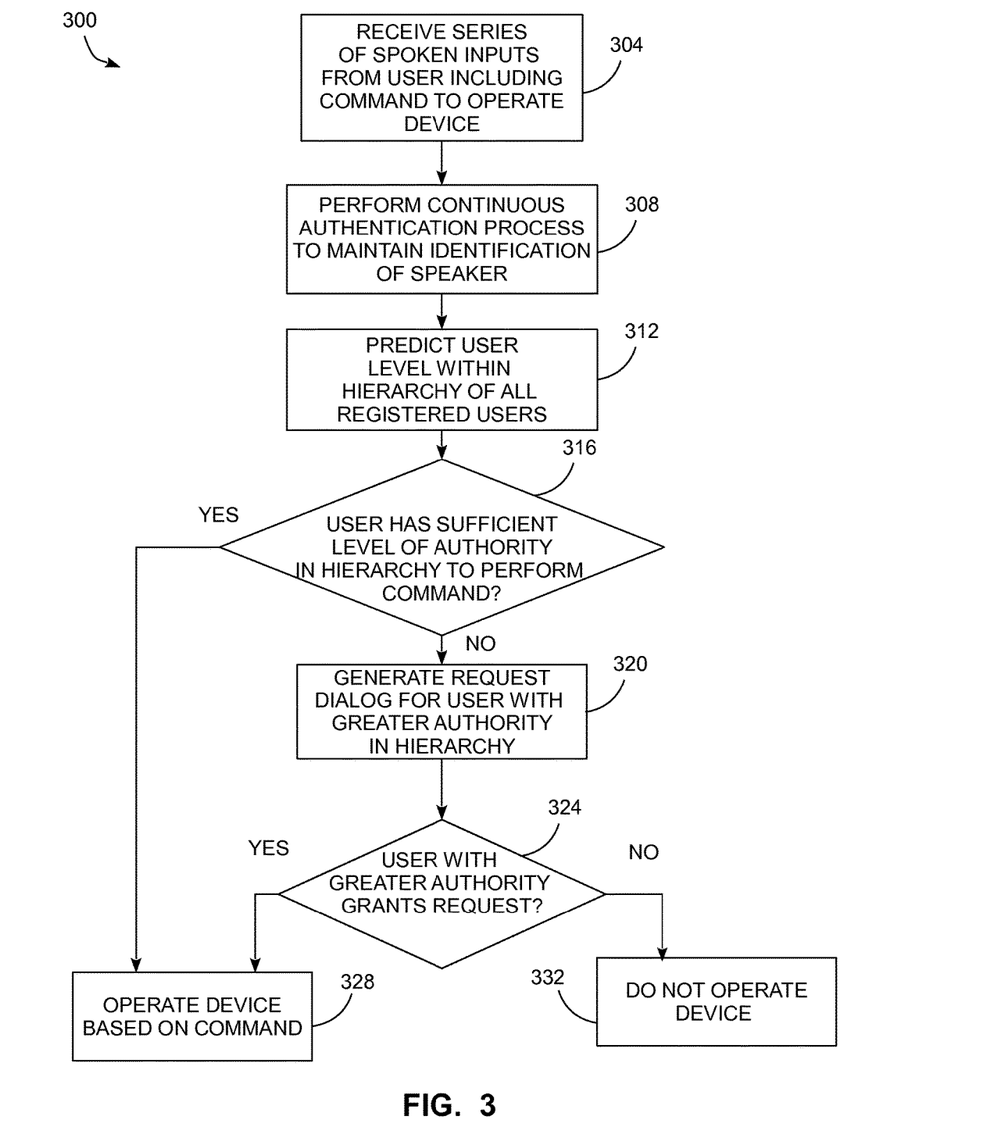
FIG. 3 is a block diagram of a process for continuous authentication and hierarchical user access in the HCI systems of FIG. 1 and FIG. 2.

FIG. 3 depicts a process 300 for continuous authentication of user input and authorization using a predicted hierarchy of users with different authority levels in the multi-user HCI systems 100 and 200. During the process 300, the HCI systems 100 and 200 receive a series of spoken inputs from a user including a command to operate a device, such as an oven or other home appliance device 105 (block 304). In the systems 100 and 200, the privacy and security management module 120 in the control system 102 performs a continuous authentication process to ensure that each spoken input in the series of spoken inputs comes from a single, authenticated user to ensure that the HCI system does not confuse inputs from two or more users (block 308). The control system 102 also predicts a level for the user in a hierarchy of the users that are registered with the HCI systems 100 and 200 (block 312). For example, the knowledge manager 124 and context manager 128 have access to domain knowledge in the memory 182 that pertains to the relationships between multiple users of the HCI systems 100 and 200. In many home-automation or in-vehicle systems, the registered users are organized in a family where the parents and children form a hierarchy. The children are lower in the hierarchy have limited access levels and the parents are higher in the hierarchy with greater access levels. The HCI systems 100 and 200 predict the hierarchy based on the ontology data for the expected relationships between the different members of the family, although other configurations have different hierarchies for different groups of users. In an alternative embodiment, the HCI systems store an express user hierarchy and access levels that are established during the registration process and the control system 102 accesses the user level in the user data stored in the memory 182 instead of predicting the user level.

The process 300 continues as the control system 102 determines if the user has a sufficient level of authority in the hierarchy to operate the device based on the command in the spoken input sequence (block 316). If the user has the proper level of authority, then the device 105 operates based on the command (block 328). In some situations, the user does not have sufficient authority (block 316) and the HCI system 100 and 200 generates a request dialog message for another user who has sufficient authority that asks for permission to perform the action on behalf of the user with the lower priority level (block 320). For example, if a child requests to turn on an oven device 105, the device control system 102 does not activate the oven immediately, but instead generates another dialog for a parent user who receives a request to activate the oven on behalf of the child. The HCI systems 100 and 200 perform the authentication process described above to ensure that the proper parent either grants or denies the request (block 324) and the control system 102 either operates the device based on the command (block 328) if the request is granted or does not operate the device (block 332) if the request is denied.

Referring again to FIG. 1 and FIG. 2, the user-experience (UX) management module 112 in the HCI systems 100 and 200 receives input from the speaker and emotion identification and tracking module, collects the interactional aspects of the dialog system, such as response time, network connectivity status, smoothness of the conversation, and suggests corresponding dialog strategies for the dialog management module 136. Various dialog strategies are designed for different situations when the speakers are happy, angry, rush, or relaxed. For example, one may add humors in the response when the speakers are happy; one may incorporate sadness in the tone when the speakers are angry; one may adopt succinct answer when the speakers are in rush (speaking rate); and one may provide a more elaborated answer when the speakers are relaxed. Yet another example, when the network connection is slow, the UX management module 112 may send a request to content presentation module via the dialog manager to inform the user that the network is slow or to suggest him or her to find another network.

In the HCI systems of FIG. and FIG. 2, the content presentation module converts the requested information into one or more sentences together with visual messages when needed, such as a map for easier to locate a position, or a number of POIs for the user to select. The one or more sentences are then sent to text-to-speech module 156 and their related multi-modal information is shown on the display to present to the user. The presentation consistency of the information from the services or assistance channels is managed in this module. The sentences have prosody and emotion labels so that some key information in the sentences is stressed. Depending on whom the system is talking to, it may dynamically select styles accordingly. For example, when a child is talking to the system, the system may sound more like a child care giver with both authority and gentleness; when an adult is talking to the system, the system may behave like an assistant with recommendation and suggestion; when an elderly person is talking to the system, the system may choose to be very respectful with good sensitivity. These labeled sentences are sent to text-to-speech module 156 for output via speakers.

In the embodiments of the HCI systems 100 and 200 that include speech output devices, the text-to-speech module 156 receives the input from the content presentation module and converts it into waveforms. The input is annotated with labels of emotion, prosody, and other expressive aspects. The waveforms are sent to one or more speakers for output. The volume is automatically adjusted via the microphone feedback and will be changed as needed according to the requests from the user.

In the HCI systems of FIG. 1 and FIG. 2, the cross-service application platform integrates multiple devices, applications, and services. The cross-service application platform provides and manages internal links among different applications so that users do not have to make explicit switch between different applications. A cross-device system that integrates a plurality of different devices addresses the needs of the user in various scenarios such as daily activities in a home, a work environment, or during operation of a vehicle. Multiple devices operate together in a networked manner to provide meaningful interaction via the dialog system with the user. For example, a typical kitchen appliances may include refrigerator for food storage, oven, microwave and cook-top for cooking, hood for ventilation, dishwasher for cleaning, water heater or tank for hot water, gas, electricity or solar for energy sources. Sensors associated with these appliances provide constant appliance state updates, and the updates are managed in the platform to be used by the dialog manager for either system-initiated dialogs or user-initiated dialogs. A related service portfolio may include an application for food purchasing, appliance purchase, maintenance and repair, infotainment applications for news, music, and sports, and hands-free communication. The functions of a hands-free communication may include making a phone call, picking up the phone call, and ending a phone call via a voice terminal with the dialog system. The integration of the system with a home phone system is seamless. For example, when a user is interacting with the system for food recipe, the home phone may start to ring. The user may say "connect me to the phone" to temporarily put the query of food recipe on hold to answer to the phone call. After the phone call, the user can get back to the recipe query left before the phone call. Such use cases can be supported through multiple threaded dialog mechanism seamlessly. The platform further supports the integration of local on-board applications via local on-board assistance channel and cloud applications via one or more remote assistance channels. The platform may have a copy that resides locally onboard or remotely in the cloud. The application service platform provides connectivity, security, load balancing, databases, catching, monitoring applications, user account management, billing process, etc.

In the HCI systems of FIG. 1 and FIG. 2, the user management module 116 detects and manages the user status and what else they are doing at the same time when they are making certain requests, such as the user is looking at certain objects, the user is busy in operating devices, or his or her eyes are open or closed. It may include the emotional aspects of the users, such as happy, angry, sad, calm, excited, or bored. This component optionally identifies a perceived energy level for the user, such as energetic, tired, or exhausted, and generates customized outputs for different perceived energy levels. Such information may be detected from his or her speech. This component takes the results from the speaker and emotion identification and tracking module. This component may further include users' level of their responsiveness. In addition, the module manages the preferences of each user for different applications.

In the HCI systems 100 and 200, the task-dependent and user-dependent privacy and security management module 120 via seamless log-in and constant monitoring and tracking of biometric and behavior prints of the speaker and together with multiple layered security system which relies on the different requirements for the needed access and operation securities. The biometric and behavior prints of the speaker are typically stored locally for privacy protection. The keys to access the sensitive files are a combination of biometric and user knowledge, and can be stored both locally and in the cloud. Multiple locations in the cloud are used to store the complete keys if the cloud is used for the desired purpose. The security process retrieves portions of the key from the multiple locations to generate a complete key that enables access to the profiling files. The allocation of the multiple cloud sites and local devices is performed by the platform. However, the dialog system may ask the user their requirements in terms of the degree of security for the specific devices and related performance tasks, and provide to the user certain recommendation for the typical level of security needed for such devices and performance tasks related to the devices. The HCI systems 100 and 200 maintain a security ontology in the memory 182 with different authorization levels and typically associated tasks to facilitate the discussion with the user and give advices when so requested. A light on the hardware device is used to indicate whether the ongoing conversation and request are communicated to the cloud applications 107 to get access to the required services.

Figure 8:
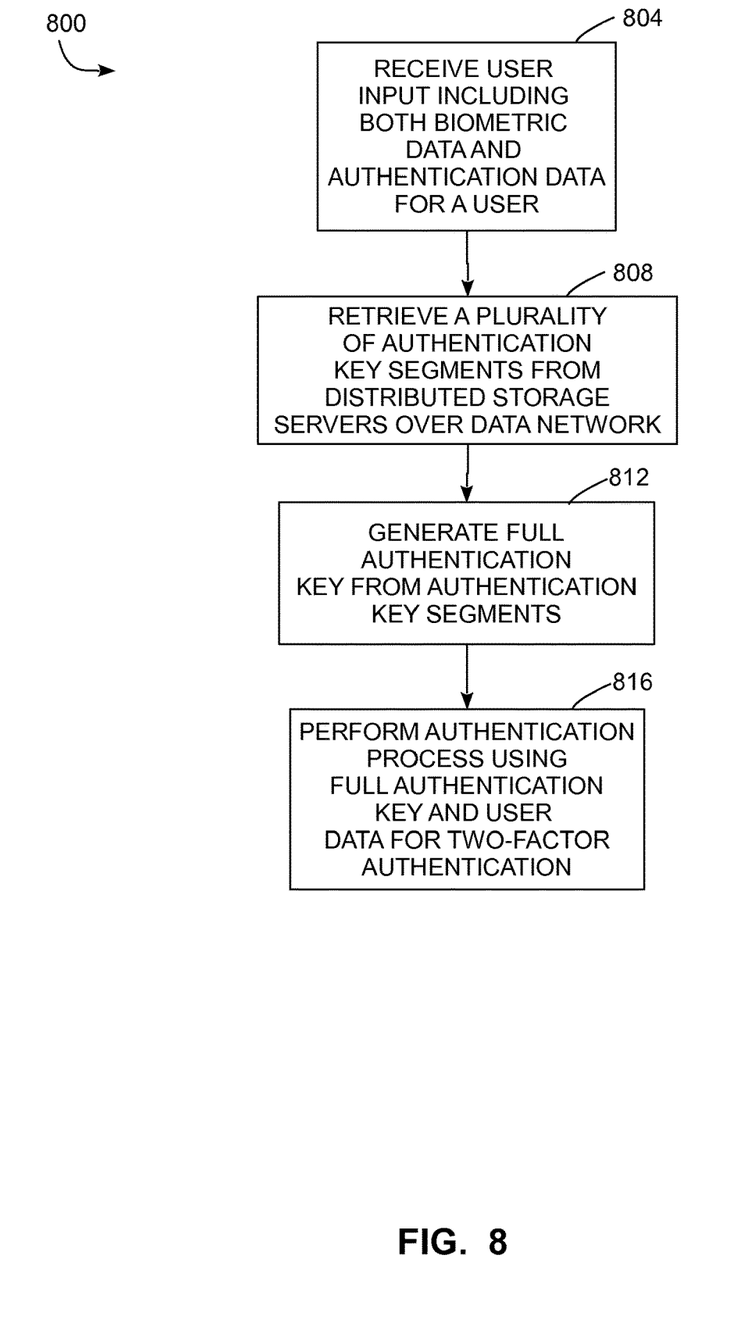
FIG. 8 is a block diagram of a process for distributed key authorization in the HCI systems of FIG. 1 and FIG. 2.

FIG. 8 depicts a process 800 for performing a two-factor authentication process for a user of the HCI systems 100 and 200. In the process 800, the control system 102 receives user input that includes both biometric data and authentication data for the user (block 804). In one embodiment, the biometric data correspond to a voice pattern of the unique characteristics of the voice for the user that provide a biometric identifier for the user. The authentication input from the user includes, for example, a spoken word or phrase that serves to authenticate the user with the HCI system 100 and 200. Thus, the authentication process is referred to as a "two factor" process that requires both something that user is (voice pattern) and something that the user knows (specific speech for authentication). Process 800 continues as the control system 102 retrieves a plurality of authentication key segments from multiple online data storage services in the distributed network cloud 104B (block 808). Each of the authentication key fragments includes only a portion of the key information that are required for the security and privacy module 120 to authenticate the identity of the user. The key fragments are held on at least two different computing nodes to prevent an attacker who controls any single compute node from having the ability to regenerate the authentication key for a particular user. The security and privacy module 120 in the control system 102 generates the full authentication key from the plurality of key fragments received from the cloud servers 104B (block 812). The control system 102 then performs the two-factor authentication using the full authentication key to verify that the speaker providing input to the HCI systems 100 and 200 is in fact the purported authorized user and not an impostor (block 816). To maintain secrecy of the authentication key, in some embodiments the control system 102 deletes the full authentication key immediately after performing the authentication process. The control system 102 optionally generates shorter-lived session keys that enable the continuous authentication of a user during a single interactive session without requiring reassembly of the key fragments to re-authenticate each input from the user.

In the HCI systems of FIG. 1 and FIG. 2, the software dialog system covers the whole lifecycle of any device and device eco-system, including the purchasing, setting up, operation, repairing, and transitioning. Adding or removing a device from the eco-system may be controlled by the eco-system platform infrastructure, and facilitated by the dialog system. Individual user interactive experience with the device and device eco-system can be maintained in encrypted profiles in files and stored both locally and in the cloud. It may also be stored only locally for privacy protection. The enrollment of a device is done similarly with the dialog system and the default parameters of the device are carried over from the past profile if any, and are via real life and short examples to guide the user to provide needed preferences. For example, during an appliance, such as fridge, setting up with the dialog system, the dialog system may ask the user to turn on the wireless on switch if he or she intends to connect it with the dialog system. After the switch is on, the dialog system detects a fridge and makes a connection. Relevant parameters are collected from the fridge by the dialog system. If the fridge settings are in normal ranges, the dialog system may by default accept and store them for future references. If the settings are not within their typical ranges as defined by the system ontology for that device, the dialog system may initiate a dialog with the user about changing them to the desirable ranges.

Figure 7:
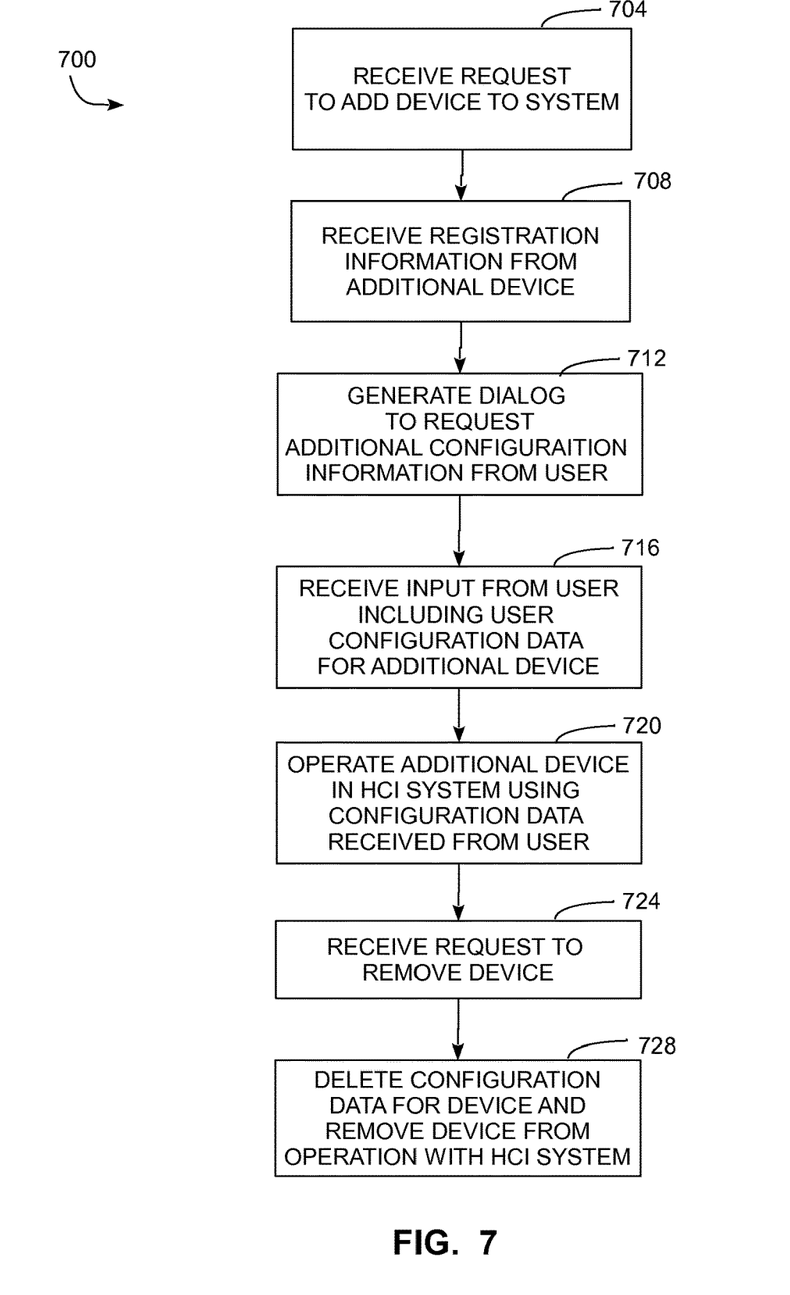
FIG. 7 is a block diagram of a component lifecycle process for components in the HCI systems of FIG. 1 and FIG. 2.

FIG. 7 depicts an example of a process 700 for lifecycle management of devices in the HCI systems 100 and 200. At the beginning of the lifecycle, the systems 100 and 200 receive a request to add a new device 105 to the system (block 704). The control system 102 also receives registration information from the additional device, such as hardware address data, a serial number, or other data that are generated at the time of manufacture of the new device (block 708). The HCI systems 100 and 200 also generate dialog outputs to request additional configuration information from the users (block 712). In some embodiments, the dialogs also include installation instructions that assist the users in the physical installation of the new device. The HCI systems 100 and 200 receive input from the users in response to the dialogs to receive the configuration data for the new device (block 716). For example, if the new device is a refrigerator, the control system 102 generates a dialog request for the user to provide operating temperature settings for the refrigerator and freezer portions of the device. The user provides the temperature settings using the voice-input or multi-modal input devices in the HCI systems 100 and 200. The control system 102 uses the configuration data from the user to control the operation of the new device (block 720). During operation of the HCI systems, one or more devices may be removed at the end of the lifecycle for the device. The HCI systems 100 and 200 receive a request to remove one of the devices 105 (block 724) and the control system 102 deletes the configuration data for the removed device and sends commands to deactivate the removed device (block 728). In some embodiments, the control system 102 also generates a dialog output with information about proper disposal and recycling of devices that have been removed to assist the user in removing the device.

The HCI systems 100 and 200 perform user enrollment and system acquaintance processes that enroll the users and setup the system in an implicit manner through one or more brief sessions with the dialog system, such as a greeting, name exchange. Other exchanges discuss system functionalities and limitations, weather, interest, sports, and food preference. During the process, a number of interaction episodes are conducted to collect user preferences, relationship among group users, and system configurations. The episodes are organized independently so that the process does not have to complete all of them in the same time. The user optionally chooses to stop after a few interactions and continue the process in another time.

The user enrollment process optionally occurs over multiple dialog sessions. Each session may add some new information to the system, and enable the enrolled user to access more applications. The voiceprints and personal preferences are captured through such dialogs, and over the multiple sessions, they become more and more reliable for user identification and engagement. The enrollment is considered to be complete if all the necessary information by the system is collected. For example, in the very first stage, the system needs to enroll the head of the household with his/her name and voice prints so that he or she can be identified reliably. For the rest of the family members to use the system, it is important to have the name and the relationship linked to the head of the household. A user may be delayed with the access of certain applications due to incomplete information in the system. In that case, the system can initiate a dialog with the user, and in some cases gets confirmed with the head of the household, to acquire the specifically required information (for example, an age of the user) in order to access such applications.

In the HCI systems 100 and 200, the enrollment through multiple dialog sessions is referred to as a progressive enrollment. During a progressive enrollment, the HCI systems 100 and 200 continue operation even if an enrollment of a user is not fully completed. The system configuration is classified into multiple operating levels including an essential level, where all the information needs to be available at the beginning, including the limitation of the system, what the system can do, and what the system cannot do, the authentication level which only certain applications require, such as turn on oven or cooktop, and the preference level where non-critical user preferences, such as whether to use female voice or male voice for output. Other operating levels are incorporated into different configurations of the HCI systems depending on the operational requirements of user interaction in each system. The system acquaintance process can be completed through different stages, similar to the user enrollment process. The parameters at the essential level need to be done in the beginning so that the system can start properly. The parameters at the authentication level can be collected when the user wants to use their associated applications if they are not already set. Finally, the parameters at the preference level can be set at whenever is convenient for the users.

Figure 4:
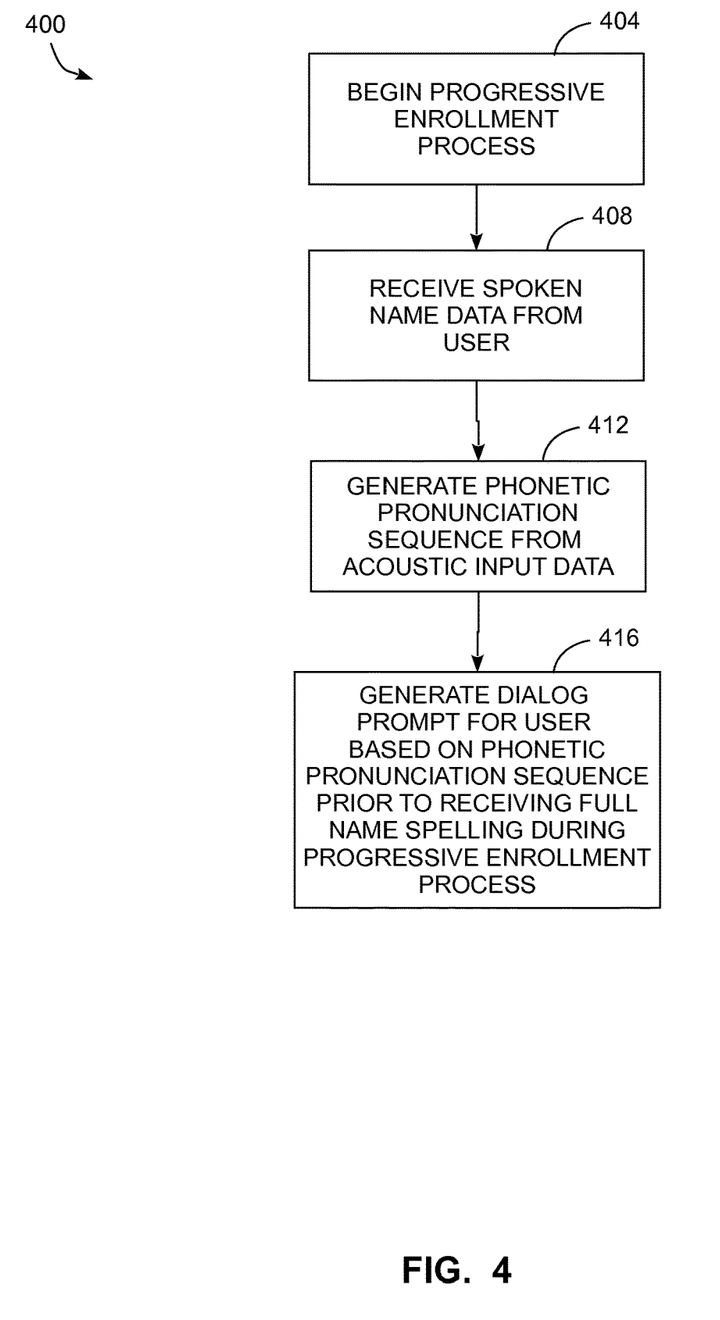
FIG. 4 is a block diagram of a process for progressive name registration in the HCI systems of FIG. 1 and FIG. 2.

FIG. 4 depicts a progressive enrollment process 400 and refers to the HCI systems 100 and 200 for illustrative purposes. In the process 400, the control system 102 begins a progressive enrollment process as a user begins to provide enrollment information that is stored with the user data in memory 182 (block 404). As noted above, the control system 102 generates multiple dialogs for the enrollment process and continues other operations during the enrollment process. During the progressive enrollment process, the control system 102 receives the spoken name of the user at least once as the systems 100 and 200 collect information about the user (block 408). The HCI systems 100 and 200 use the speech recognition module 138, user management module 116, NLU 140, and dialog management modules 136 to generate a phonetic pronunciation sequence corresponding to the spoken name of the user even if the systems 100 and 200 have not yet received a full spelling of the name during the enrollment process (block 412). The control system 102 then generates an audible dialog that uses the phonetic pronunciation sequence to repeat the name of the user via the text-to-speech module 156 (block 416). The progressive enrollment process uses the name of the user to customize the interface for individual users during the progressive enrollment process.

Progressive name registration occurs during the user enrollment when a user registers his or her name to the system so that the system can recognize and interact properly. The state-of-art speech recognition system has difficulties in recognizing person names 100% correctly. In one embodiment, the name registration process occurs in three different stages. First, dialog driven initial name recognition: the dialog system conducts a structured dialog to prompt the user to provide his or her name. The speech recognizer transcribes the user input into a sequence of words. A validation is done on the sequence of words to see where the person name starts and where the name ends in the input sequence. A confirmation process is applied if the sequence does not directly correspond to a known or common person name. In another stage, the HCI system performs a name pronunciation training process. If the recognized sequence is a known name, the name is stored for later reference to that person together with his or her voice prints. If the recognized sequence is not a known name, then the closest phonetic pronunciation sequence is generated, and it is attached to a symbol with the concatenated words in that sub-sequence. When multiple sequences are obtained from the confirmation sequence, the corresponding phonetic pronunciation sequences are compared. If they are close enough, they are all accepted, and the associated symbols are retained for further processing. The name refinement stage occurs when multiple symbols for a user are provided for comparison with commonly used names. If the symbols correspond to one common name, then the common name will be confirmed with the user at a later stage in a dialog (e.g., "Ok, so your name is Mike"). If a common name is not available, the best name sounding sequence is concatenated and formed a new symbol as the name for the internal use in the system. It will be later searched in the internet for a better candidate when connectivity is available. In that case, a related info about the name will also be retrieved and stored, such as the meaning of the new name symbol. The meaning will then be used in a dialog with the user to get a meaningful conversation (e.g., "so the meaning of your name is xxx?").

In the HCI systems of FIG. 1 and FIG. 2, the acoustic wave files acquired from the users during the interactions are stored in a memory or database within the system in associated with transcriptions, speaker ids, dialog session ids and dialog turn ids. Statistics of these files are accumulated based on the transcribed sentences, including pronunciation frequency, word frequency, sentence frequency, and prosody mark frequency. These wave files are also labeled with the timestamp and significance scores. The significance scores are computed and adjusted over the time. The stored files are used for adaptation over the time. Initially, the files are assigned with a constant score. The scores are reduced over the time. One formula for the score s is: $s(t+1)=s(t)-r$, where r is the memory decay factor. The ones that have been used for adaptation get another discount. The ones that have been emphasized later-on will have their scores increased by a factor. In the system, there is a limit of the storage size on the device. If the files have significance scores below a pre-defined threshold, they get deleted. Such deletion operation happens periodically, especially when the total size of the stored files approach a preset storage limit, after completion of a dialog session, during the night when no interaction is expected for a significant period of time. The information is used for adapting the speaker recognition algorithm (using wave files with the speaker ID), the speech recognition algorithm (producing personalized grammar rules and pronunciation dictionary), and the response generation module (which responses are liked by the speaker).

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A human computer interaction (HCI) system comprising:
   at least one voice input capture device that uses a far field microphone array and a signal processing module that is configured to receive acoustic signals and phase information from different voice capture channels in the far field microphone array;
   at least one output interface; and
   a control system operatively connected to the at least one voice input capture device and the at least one output interface, the control system being configured to:
   convert acoustic signals, at least some of which correspond to spoken commands from a user, received through the at least one voice input capture device into word sequences using a speech recognition module in the control system;
   generate with the speech recognition module a signal indicating environmental noise in the acoustic signals received from the at least one voice input capture device when the speech recognition module cannot convert the acoustic signals corresponding to the spoken commands received through the at least one voice input capture device into word sequences due to environmental noise in the acoustic signals not corresponding to the spoken commands;
   identify an acoustic event causing the environmental noise based on the acoustic signals not corresponding to the spoken commands received through the at least one voice input capture device that correspond to environmental sounds using an acoustic event recognition module in the control system that compares the acoustic signals received by the signal processing module from the different voice capture channels in the far field microphone array to a plurality of acoustic event prints and assigns a label corresponding to the acoustic event identified by the comparison; and
   generate an audible output to the user with the at least one output interface, the audible output including an identification of the environmental sounds based on the assigned label of the identified acoustic event and a request to the user to reduce or eliminate the environmental sounds corresponding to the assigned label to improve the conversion by the speech recognition module of the acoustic signals corresponding to the spoken commands received from the at least one user input interface into word sequences.

* * * * *